United States Patent [19]

Boulogne et al.

[11] Patent Number: 4,564,838

[45] Date of Patent: Jan. 14, 1986

[54] DATA COMMUNICATION NETWORK AND METHOD OF COMMUNICATION

[75] Inventors: Gerardus F. Boulogne, Nieuwegein; Bernardus P. J. van Berkel, Apeldoorn, both of Netherlands

[73] Assignee: NCR Corporation, Dayton, Ohio

[21] Appl. No.: 437,071

[22] Filed: Oct. 27, 1982

[30] Foreign Application Priority Data

Mar. 29, 1982 [GB] United Kingdom ................ 8209200

[51] Int. Cl.⁴ ............................................ H04Q 00/00
[52] U.S. Cl. ............................. 340/825.5; 340/825.06; 340/825.51; 370/85
[58] Field of Search ....................... 340/825.04, 825.06, 340/825.5, 825.51; 370/28, 29, 85, 95; 333/24, 171; 375/7; 455/38, 88

[56] References Cited

U.S. PATENT DOCUMENTS

| | | | |
|---|---|---|---|
| 3,445,822 | 5/1969 | Driscoll ............................ | 340/172.5 |
| 3,701,109 | 10/1972 | Peters ............................. | 340/825.51 |
| 3,983,323 | 9/1976 | Griffith et al. .................... | 370/28 X |
| 4,012,590 | 3/1977 | Haass .................................. | 370/28 |
| 4,038,644 | 7/1977 | Duke et al. ......................... | 364/900 |
| 4,050,097 | 9/1977 | Miu et al. ............................ | 364/200 |
| 4,058,681 | 11/1977 | Imaizumi et al. .................... | 370/85 |
| 4,063,220 | 12/1977 | Metcalfe et al. ............. | 340/147 LP |
| 4,099,024 | 7/1978 | Boggs et al. ....................... | 178/71 R |
| 4,177,450 | 12/1979 | Sarrand ............................ | 340/825.5 |
| 4,227,178 | 10/1980 | Gergaud et al. ................... | 370/85 X |
| 4,232,294 | 11/1980 | Burke et al. ....................... | 340/825.5 |
| 4,319,222 | 3/1982 | Davis et al. ....................... | 340/825.5 |
| 4,366,480 | 12/1982 | Van Hatten ...................... | 370/85 |
| 4,385,382 | 5/1983 | Goss et al. ........................ | 370/85 X |
| 4,451,881 | 5/1984 | Grice et al. ....................... | 370/85 X |

FOREIGN PATENT DOCUMENTS

| | | |
|---|---|---|
| 0003849 | 5/1979 | European Pat. Off. . |
| WO80/01025 | 5/1980 | PCT Int'l Appl. . |
| WO80/01426 | 7/1980 | PCT Int'l Appl. . |
| WO83/01315 | 4/1983 | PCT Int'l Appl. . |
| 1099575 | 1/1968 | United Kingdom . |
| 1365838 | 9/1974 | United Kingdom . |
| 2015217A | 9/1979 | United Kingdom . |
| 2114333 | 8/1983 | United Kingdom . |

OTHER PUBLICATIONS

Metcalfe, Robert M. et al., "Ethernet: Distributed Packet Switching for Local Computer Networks", Communications of the ACM, Jul. 1976, vol. 19, No. 7, pp. 393-404.

Primary Examiner—Ulysses Weldon
Attorney, Agent, or Firm—Albert L. Sessler, Jr.; Elmer Wargo

[57] ABSTRACT

A local area network has a plurality of data stations 1 each connected to a common data channel 2 via a receiver 5, a transmitter 6 and a directional coupler 7, wherein, in order to resolve contention for the channel and at the same time providing each station with statistically an equal chance of gaining use of the channel, each station contends for use of the channel by transmitting, when the channel is free, transmission request signals in a sequence of consecutive time periods wherein in each time period the station either transmits a request or does not transmit a request according to a predetermined code. If in any time period a data station 1 transmits a request but detects no transmitted request by other stations, the station is permitted use of the channel 2. If the station 1 does not transmit in any time period and another station transmits a request, then the station aborts contention.

11 Claims, 19 Drawing Figures

MT

DT

DS

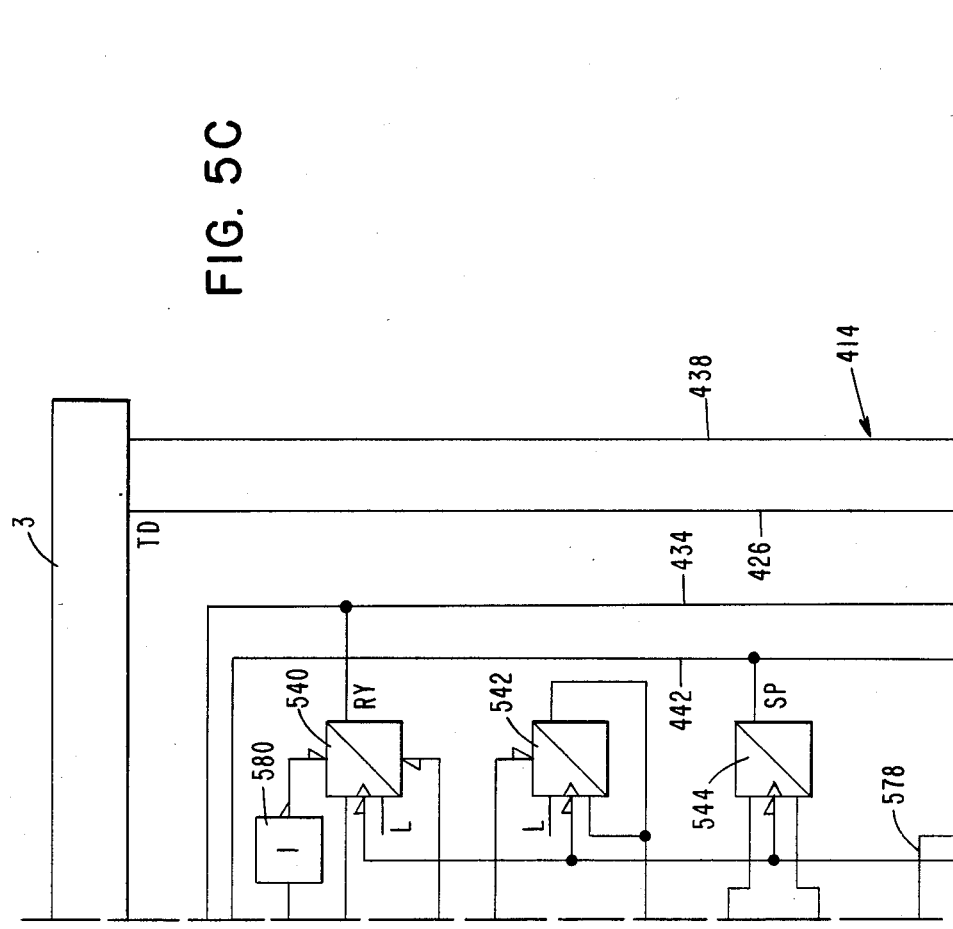

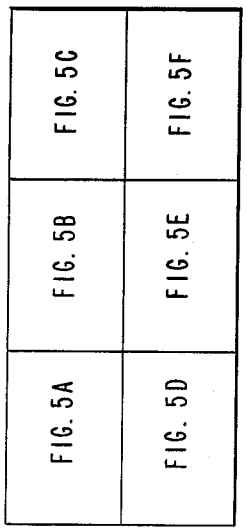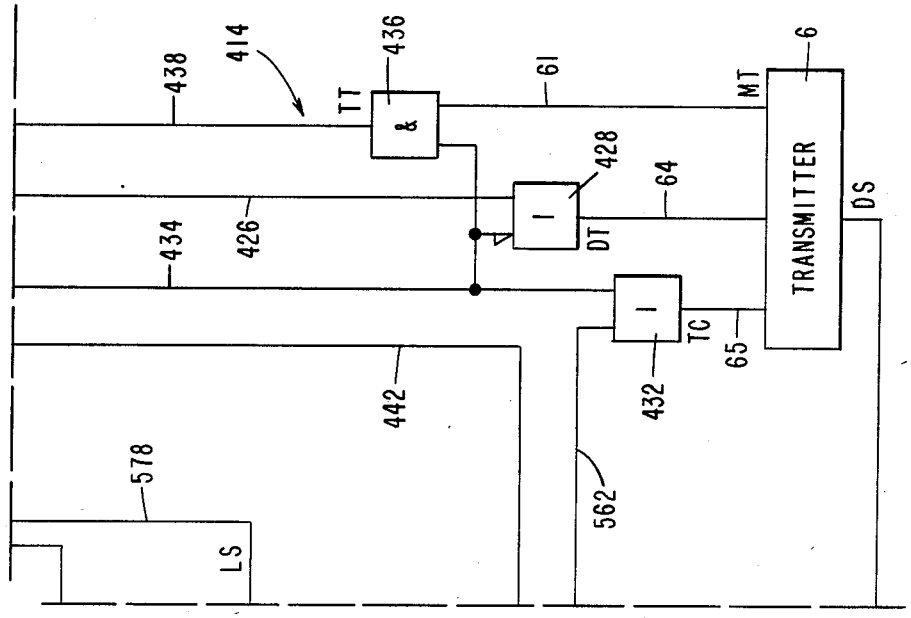

| INPUTS | | | | | OUTPUTS |
|---|---|---|---|---|---|
| PRESET | CLEAR | CLOCK | J | K | Q |
| L | H | X | X | X | H |
| H | L | X | X | X | L |
| L | L | X | X | X | H |
| H | H | L | L | L | $Q_0$ |
| H | H | L | H | L | H |
| H | H | L | L | H | L |
| H | H | L | H | H | TOGGLE |
| H | H | H | X | X | $Q_0$ |

DATA COMMUNICATION NETWORK AND METHOD OF COMMUNICATION

BACKGROUND OF THE INVENTION

This invention relates to a data communication network and method of communication therein, and has particular application to a local area network which provides communication between a plurality of data processing stations located within a moderately-sized, geographical area, e.g. a multi-story office building.

In local area networks, a passive communication medium such as a coaxial, twisted pair or fibre optic cable provides a common serial data channel to interconnect the data stations. Each data station may, for example, comprise a micro- or minicomputer, a memory disc system, a printer, an intelligent or non-intelligent video display unit or an interface to a public communications network. A transmitting station transmits frames or packets of data of predetermined format in accordance with a standarized protocol over the data channel. The station for which the transmission is intended recognizes the address in a data frame and receives the data. A network architecture including higher levels of control software is provided for efficient control of the network.

Difficulties arise in scheduling transmissions in busy periods when more than one station may wish to transmit at the same time.

In European patent application No. 000,3849 there is disclosed a time-division, multiplexing scheme whereby the risk of two or more stations transmitting at the same time and of the transmissions colliding is avoided. However, such a scheme which operates solely by allocating fixed time intervals for transmission for each station is not efficient when communication traffic occurs in bursts, since a large part of the time available for transmission may be wasted.

One well-known method of scheduling transmissions designed specifically for traffic occurring in bursts is used in the Ethernet system and disclosed, for example, in U.S. Pat. No. 4,063,220. In this system, when a station wishes to transmit, the presence of other transmissions on the data channel is detected, and transmission is delayed until no other transmissions are detected. Once a transmission is initiated, if interference or collision is detected with a transmission initiated at about the same time by another station, transmission at each station is aborted. A collision enforcement mechanism temporarily jams the channel to ensure that all stations participating in the collision are aware of the collision and will abort. A random number generator is employed at each station to determine an interval of time at the completion of which the next attempted transmission takes place so as to resolve the contention for the channel.

The Ethernet system has certain disadvantages since in busy periods to avoid blocking of the channel it is necessary, after a certain number of attempts at retransmission, to reschedule the transmission at a higher level of control in the network architecture. A further disadvantage is the requirement for reformatting the data package whenever retransmission is attempted. In addition the channel is jammed for a relatively long period whenever a collision occurs.

Another approach which has been employed for scheduling transmissions is the assignment of a transmission priority to each data station, as disclosed for example in International patent application No. WO 80/01426. In the event of contention for the channel by more than one data station, the contention is resolved in favor of the station with the higher, assigned priority. However, a disadvantage of such a priority scheme is that in busy periods stations with a low priority may not gain access to the channel.

SUMMARY OF THE INVENTION

It is an object of the invention to provide in a data communication network a method and means of scheduling transmissions which are suitable for transmissions occurring in bursts but wherein the risk of data stations being denied an opportunity to transmit is alleviated and the necessity to invoke a higher level of control of the network architecture to maintain control in busy periods is avoided.

According to one aspect of the present invention, there is provided a method of communication in a data communication network on a common data channel between data stations, wherein each of the data stations wishing to transmit data monitors the data channel to ascertain whether other data transmissions are currently taking place on the channel, wherein, in order to contend for use of the channel, each data station, having ascertained that data transmissions on the channel have ceased, initiates transmission of transmission request signals during a sequence of consecutive time periods in each of which the data station either transmits or does not transmit a transmission request signal on the channel according to a predetermined code assigned to that data station, the data station monitoring the channel during said sequence and aborting contention for use of the channel if it finds that another data station is transmitting a transmission request signal while the first mentioned data station is not transmitting such a signal.

According to a further aspect of the present invention, there is provided a data communication network having a plurality of data stations connected by a common data channel, each station having a transmitter and a receiver, wherein each data station includes channel contention means for initiating transmission request signals in a sequence of consecutive time periods in each of which the data station either transmits or does not transmit a transmission request signal according to a predetermined code assigned to that data station, and further includes contention resolving means for determining during said sequence whether any other data station is transmitting a transmission request signal while the first mentioned data station is not transmitting such a signal, said contention resolving means including means for aborting the contention upon such determination.

In accordance with the invention, a method and means of resolving data channel contention are provided which can resolve contention in a shorter time than known arrangements employing random time intervals, thereby avoiding the requirement for network control at a higher level in busy periods. In accordance with one embodiment of the invention, at the cessation of data transmission, all data stations contending for channel use initiate transmission requests, and are thereby synchronized in operation. This permits the resolution of contention by each data station monitoring the channel for transmission request signals while the data station is not transmitting such a signal.

In a data communications network in accordance with the invention, each station is assigned a predetermined code for transmitting a sequence of requests in said time periods which can ensure that each data station has a fair opportunity to gain channel control thereby alleviating the problem associated with priority systems of certain stations being unable to gain control of the signal path. Preferably each data station is assigned a unique cyclic code, and during a series of channel contentions, each station starts a succeeding channel contention sequence at a position in the cyclic code determined by the position at which channel contention previously ceased. This can ensure that two contending stations have statistically an equal chance of gaining channel control.

In less busy periods when the data channel may be unused, means are provided responsive to long periods with no transmission on the channel for initiating a contention cycle immediately after a request for transmission is made within the data station, and synchronization with other data stations is unnecessary.

Each station is preferably equipped with a directional coupler between the transmitter and receiver and data channel. In networks where the data stations are relatively close together the contention resolving means of each data station may detect the condition of only itself transmitting a request signal in a said time period, in which condition the data station is immediately permitted use of the channel. If, however, the station detects a transmission request signal in a time period when the station is not transmitting a request signal, then the station immediately aborts contention. This provides very fast transmissions over the data channel. It should be understood that the channel may be used for transmission to a plurality of stations at the same time.

In larger networks in which signal loss values cannot be handled by the directional couplers in stations at the far ends of the network, then it is not possible for the data station to detect the condition of only the data station transmitting a request signal in a time period. In this situation, the channel contention sequence may be carried out for a predetermined time, say one cycle of the cyclic code, and the data station may detect whether any transmissions are detected during any time period when the data station is not transmitting a transmission request signal. If no transmissions are detected, then channel use is permitted at the end of the predetermined time.

Preferably said transmission request signal comprises a burst of pulses followed by a time interval at least as long as the echo time of the data channel, i.e. twice the longest propagation delay of the associated signal path. Such pulse burst is relatively easily detected by other data stations in the same time period. This is preferable to the Ethernet system wherein a request signal as such is not transmitted but an entire data frame scheduled for transmission is transmitted. In the Ethernet system, jamming of the channel as a collision enforcement mechanism is required, and in addition, the data frame must be reformatted for each consecutive channel contention. The use of the transmission request signal avoids the need for a collision enforcement mechanism and avoids the need for reformatting the data frame.

BRIEF DESCRIPTION OF THE DRAWING

A preferred embodiment of the invention will now be described with reference to the accompanying drawing, wherein:

FIGS. 5A, 5B, 5C, 5D, 5E, and 5F taken together as shown in FIG. 5G constitute a circuit diagram of a contention controller included in the data station of FIG. 1;

DETAILED DESCRIPTION OF THE INVENTION

Figure 1:
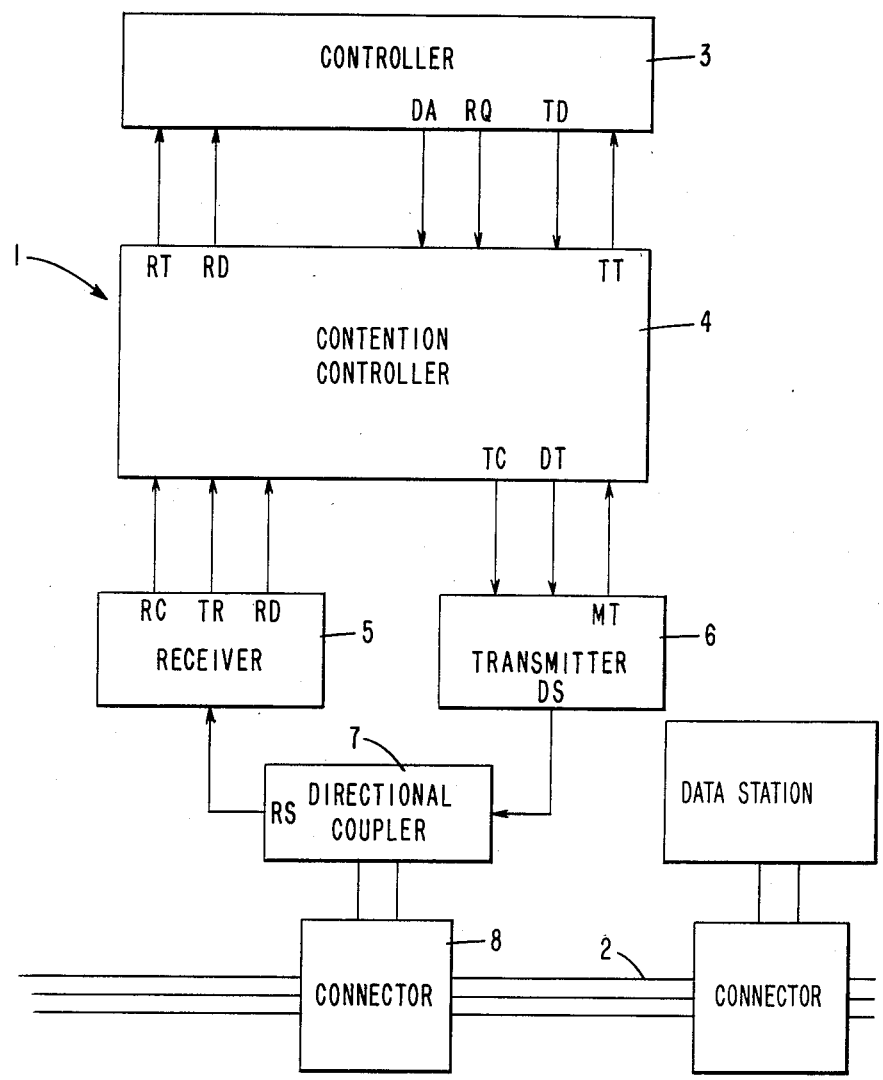
FIG. 1 is a block diagram of a data station of a data communication network made according to this invention and coupled to a coaxial cable, forming a common data channel of the network.

Referring to FIG. 1 of the drawing, there is shown a data station 1 of a communication network comprising a local area network. As shown in FIG. 1, the local area network can include more than one data station. The station 1 is coupled to a data channel 2 formed by a suitably terminated coaxial cable having for this example a maximum length of 3.4 Km, the channel 2 serving as a common serial data channel connecting the data station 1 to eight other similar data stations in the present embodiment, although there could be up to a maximum of about three hundred and forty stations, for example.

The data station 1 includes a controller 3 for receiving and formatting information to be transmitted over the network in the standard frames or packets of data. The controller 3 may be a programmed commercially available microcomputer. In order to avoid the risk of collision of data frames on the data channel 2, a channel contention controller 4 is provided. The controller 4 is connected to a receiver 5 and to a transmitter 6, which are coupled to the data channel 2 by a directional coupler 7 and an electrical connector 8. The coupler 7 normally prevents transmissions by the transmitter 6 from being detected by the receiver 5.

Figure 2:
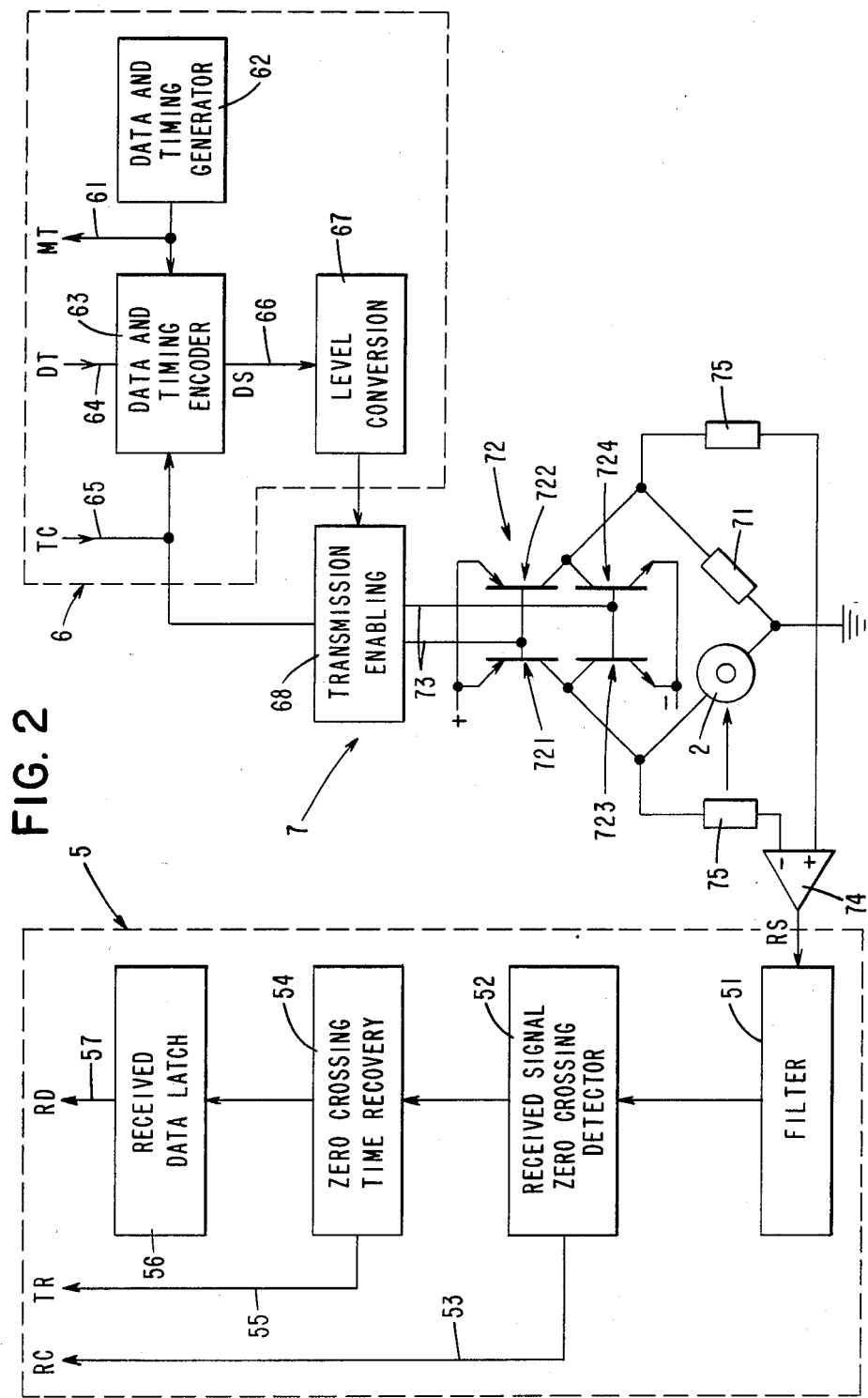
FIG. 2 is a more detailed block diagram of the receiver, transmitter and directional coupler of the data station shown in FIG. 1.
Figure 3A:
FIGS. 3A, 3B, 3C, and 3D are waveform diagrams.
Figure 3B:
Figure 3C:
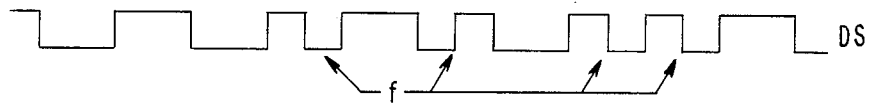
Figure 3D:
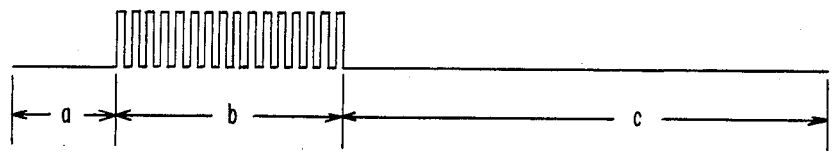

In order to contend for use of the channel 2, each data station of the local area network carries out a channel contention sequence prior to data transmission by transmitting transmission request signals in a sequence of consecutive time periods each having a length corresponding to 64 timing pulses, wherein in each time period the data station either transmits or remains silent (i.e. does not transmit) according to a predetermined code assigned to that data station. The form of a transmission request signal occurring in a single time slot is shown in FIG. 3D, this comprising an initial silent period a having a duration of eight timing pulses to ensure that the channel is settled or to allow for synchronization errors, followed by a pulse burst b of sixteen timing pulses and a period of silence c of forty timing pulses which is greater than twice the longest delay in the network (30 pulses). The entire time period or slot is of a duration of 64 timing pulses, these pulses being provided by a data timing generator 62 (FIG. 2) included in the transmitter 6. A data station can distinguish between regular data and a transmission request signal since regular data has a minimum bit length of 32 bits.

When a data station like 1 wishes to transmit, there are two possible conditions of the data channel 2, namely the channel is already occupied with a data transmission or the channel is not being used.

As will be explained in more detail later, when the data channel 2 is occupied with a data transmission, a data station like 1 is prevented from transmitting. There may frequently be two or more stations in busy time periods wishing to transmit by the time the data transmission on the channel ceases. Each station wishing to transmit detects the end of transmission and initiates, in synchronism with the other stations wishing to transmit, a sequence of consecutive time periods in each of which each station either transmits or remains silent. In the case of two or more stations like 1 each issuing a transmission request in the same time period, each such station will detect the transmission of the other during the same time period and will be unable to obtain use of the data channel. It will be appreciated that because of propagational delays, there will be a time differential between the initiation of the transmission request signals at the data stations and also a delay in the receipt of a request signal by another station. However, the time period is sufficiently long to accommodate these differentials.

If in the next time period only one station transmits a transmission request signal and the other stations do not transmit, then the other stations will receive this request signal and will thereupon abort channel contention. The transmitting station will detect the absence of other transmission request signals on the data channel and will thereupon gain use of the channel.

The shortest data frame is longer than a single signal burst of a transmission request. If several stations are in contention for the data channel 2, there may appear at each station multiple overlapping transmission request signals due to propagation delays, and as a result there could be a risk that a valid data frame may be simulated by such multiple signals. However, such a simulated data frame is not received in the controller 3. Thus, contention can be resolved only when finally a single transmission request signal appears. At this stage there is no longer any danger of data frame simulation and the station is set to the reception expected state. With the station in the reception expected state, when the length of a received transmission is detected to be about the length of a data frame, the station will change its reception expected state into a transfer state.

Each station is assigned a unique cyclic code for the contention sequence, according to the following table.

TABLE 1

| Slot Number | Cyclic Code In Binary Notation | | | | | | | |
|---|---|---|---|---|---|---|---|---|
| | 0 | 1 | 2 | 3 | 4 | 5 | 6 | 7 |
| Station Number | | | | | | | | |
| 1 | 0 | 0 | 0 | 1 | 0 | 1 | 1 | 1 |
| 2 | 0 | 0 | 0 | 1 | 1 | 0 | 1 | 1 |
| 3 | 0 | 0 | 0 | 1 | 1 | 1 | 0 | 1 |
| 4 | 0 | 0 | 1 | 0 | 0 | 1 | 1 | 1 |
| 5 | 0 | 0 | 1 | 0 | 1 | 0 | 1 | 1 |
| 6 | 0 | 0 | 1 | 0 | 1 | 1 | 0 | 1 |
| 7 | 0 | 0 | 1 | 1 | 0 | 0 | 1 | 1 |
| 8 | 0 | 0 | 1 | 1 | 0 | 1 | 0 | 1 |
| 9 | 0 | 1 | 0 | 1 | 0 | 1 | 0 | 1 |

As shown in Table 1, each station transmits a sequence of transmission request signals in a series of 8 consecutive time periods or slots, the left hand bit designating the first slot and the right hand bit designating the last slot. As previously mentioned, each time period or slot corresponds to 64 timing pulses. A bit "1" indicates the issuance of a transmission request signal and a bit "0" indicates the absence of a transmission request signal. Thus for station 1, in a contention sequence, the first opportunity to transmit occurs during the fourth slot (marked slot number 3), and further opportunities occur during the sixth, seventh and eighth slots. If, for example, stations 1 and 2 wish to transmit immediately following a data transmission, then these two stations initiate their first slot. Nothing happens until the fourth slot (marked slot number 3) when both stations transmit a transmission request signal. Neither station will gain use of the channel since each station will detect the request of the other station. In the fifth slot, only station 2 transmits a request, and therefore station 2 will gain use of the channel for data transmission, since station 1 will detect the transmission request signal and will abort contention, and station 2 will detect the absence of any other transmission request signal.

If station 1 still desires to transmit over the network at the end of the data transmission by station 2, then it will initiate a further contention cycle, but starting at slot six of the code, which is the slot immediately following the slot at which the previous contention was aborted. Because station 1 is arranged to transmit transmission request signals in slots six, seven and eight, station 1 will now have a greater chance of gaining use of the channel.

It will be observed that for each station the code is formed of eight slots, four of which are inactive (bit "0") slots and four of which are active (bit "1") slots in which transmission requests are made. Thus on a statistical basis, when two stations are in contention they will have an equal opportunity to gain the use of the data channel, in view of the cyclic nature of the codes and the fact that after a station has aborted contention for the data channel the first slot in its code is now that slot immediately following the slot at which it aborted contention.

It is possible to provide stations with a higher priority, i.e. a greater chance of gaining control of the channel, by assigning codes having a greater number of active slots than the number of active slots in codes assigned to other stations.

It will be noted from Table 1 that no assigned code has more than three consecutive inactive slots. As will be described later, means are provided so that once a data station has detected a period of inactivity on the data channel corresponding to four consecutive slots, it knows that no other station is seeking use of the channel 2 and so it can immediately begin a request cycle.

There may be stations connected to the data channel 2 at a relatively long distance away from the data stations forming the local area network. Because the receivers 5 in such remote stations must be of high sensitivity, the directional couplers 7 in the remote stations would not be able to discriminate a received transmission request signal (having a very low signal strength) from a transmitted transmission request signal leaking to the receiver 5 from the transmitter 7 of the same station. Also, there may be stations connected to the data channel 2 which by reason of expense are not equipped with a directional coupler 7. Such stations cannot therefore participate in the contention scheme described above since they are unable to detect silence in a time slot when they are the only stations to issue a transmission request signal. Such stations are provided with a cyclic code similar to those in Table 1 for issuing transmission requests when transmission is desired. In an alternative mode of resolving contention a station transmits transmission request signals for about one cycle of the code, and the arrangement is such that the station gains use of the data channel only if no transmission request signal from another station is detected during any of the silent periods of the cycle. Thus for stations like 1 equipped with directional couplers 7, the station automatically reverts to the second mode of resolving contention when it is too remote from the other stations to discriminate received signals from transmitted signals.

Table 2 shows the relation between the number of slots in a cycle of a cyclic code and the number of unique cyclic codes, that is to say the number of stations having an equal chance of gaining use of the data channel.

TABLE 2

| Number of slots | 5 | 6 | 7 | 8 | 9 | 10 | 11 | 12 | 13 | 14 |
|---|---|---|---|---|---|---|---|---|---|---|
| Number of stations | 2 | 4 | 5 | 10 | 14 | 26 | 42 | 80 | 132 | 246 |

Referring to FIGS. 2 and 3A–3C, the receiver 5, the transmitter 6 and the directional coupler 7 of a station equipped with a directional coupler will now be described in more detail.

The transmitter 6 (FIG. 2) transfers data into the data channel 2 under control of a master timer signal MT, a data to be transmitted signal DT, and a transmitter control signal TC. The master timer signal MT (FIG. 3A) appears on a line 61 and is derived from the data timing generator 62 which includes a crystal clock of 1 MHz. The signal MT is used as a clock signal in the data frames to be transmitted and for control of the contention controller 4. The signal MT defines the base band frequency of the data channel 2. The signal MT is transmitted to a data and timing encoder 63 which combines the signal MT with the data to be transmitted signal DT (FIG. 3B) which appears on a line 64. The combining takes place under control of the transmitter control signal TC which appears on a line 65 to provide a phase encoded data signal DS (FIG. 3C) for transmission on a line 66. The signals are combined to provide the phase encoded data signal DS which has a positive transition for a binary one data signal and a negative transition for a binary zero data signal. When consecutive data signals are of the same polarity, it is necessary to have insignificant transitions in the signal DS as indicated at f of FIG. 3C.

A level conversion unit 67 is provided for leveling the signals DS to adequate voltages to control the directional coupler 7. A transmission enabling unit 68 inhibits the directional coupler 7 when the signal TC is off.

The directional coupler 7 (FIG. 2) comprises a bridge arrangement with the data channel 2 forming one arm of the bridge and a balancing resistor 71 forming an adjacent arm of the bridge, the connection between the adjacent arms being grounded. The other arms of the bridge are formed by the emitter-collector paths of a monolithic transistor array 72, the transistor bases being controlled by the transmission enabling unit 68 via lines 73. The transistor array 72 comprises first and second PNP transistors 721 and 722 having their bases connected together and their emitters connected to a source of positive potential, and third and fourth NPN transistors 723 and 724 having their bases connected together and their emitters connected to a source of negative potential. The first and third transistors 721 and 723 form a complementary pair constituting one arm of the bridge and the second and fourth transistors 722 and 724 form another complementary pair constituting another arm of the bridge. The transistors are switchable between one state in which transistors 721 and 722 are switched off and transistors 723 and 724 are switched on in the active state with a high emitter-collector impedance, and another state in which transistors 723 and 724 are switched off and transistors 721 and 722 are switched on in the active state with the same emitter-collector impedance as the impedance of transistors 723 and 724 in the active state. An operational amplifier 74 is connected by way of resistors 75 across a diagonal of the bridge. In operation, for transmission, signals are transmitted to the data channel 2 by switching the transistor array 72 to provide a signal voltage across the channel and ground. Because the resistor 71 is chosen to balance the impedance of the cable forming the data channel 2, the transmitter signals appearing at the inputs to the amplifier 74 are of equal magnitude, and there is no signal detected by the receiver 5. For reception of signals transmitted by other stations which appear across the channel between ground and the positive input to the amplifier 74, these signals are amplified and fed to the receiver 5.

With the construction of the directional coupler 7 (FIG. 2) described above, it is possible for the receiver 5 to detect signals 28 dB. smaller than signals transmitted at the same time by the transmitter 6. The receiver 5 comprises a filter 51 for eliminating out-of-band noise for both high and low frequencies. In addition, a compromise-frequency equalizer is provided to compensate for the linear amplitude distortion of the cable and to minimize inter-symbol interference, that is to say interference due to oscillations preceding and following the leading and trailing edges respectively of a pulse. A zero-crossing detector 52 provides a received carrier signal RC on a line 53 which is high when zero crossings are detected above a predetermined threshold, which threshold is defined to ensure the receipt of signals from remote stations when attenuation may be appreciable but to avoid detection of erroneous zero crossings owing to noise and interference. Only when regular zero crossings are detected does the received carrier signal RC go high. A zero crossing time recovery unit 54 discriminates insignificant transitions (f FIG. 3C) from significant transitions (i.e. transitions indicating binary data levels). This is effected by a timer which is started at a detected transition and has a timing interval greater than half a data cycle such that a following insignificant transition will not activate the timer and hence will not be detected. The unit 54 also provides on a line 55 a timing reference signal TR for the received signal.

A received data latch circuit 56 buffers in a latch detected significant transitions to provide a received data signal RD on a line 57, representing the data received by the receiver.

The contention controller 4 (FIG. 4) is comprised of three main parts; a reception control unit 410 for distinguishing received data frames from received transmission request signals; a slot generator 412 for generating transmission request signals; and a transmission control unit 414 for enabling data transmission.

The reception control unit 410 (FIG. 4) serves to distinguish a data signal from multiple overlapping transmission request signals. The unit 410 provides a reception expected signal RE on a line 416 to an AND gate 418 to enable the gate 418 to transmit a received data timing signal RT to the controller 3 on a line 420, thereby enabling the controller 3 to receive the received data signal RD on the line 57.

For transmission, the controller 3 (FIG. 4) provides a request signal RQ on a line 422 to the transmission control unit 414. A direct access signal DA on a line 424 overrides the action of the contention controller 4 to provide immediate access to the data channel 2 for the data station. This may be necessary where, for example, the station is a host computer which controls all other stations at a higher level or where full duplex communications occur between two stations as will be described later.

A transmitted data signal TD (FIG. 4) on a line 426 is applied to one input of an OR gate 428, and a ready signal RY from the transmission control unit 414 enabling readiness for transmission is applied to a second, inverting input of the gate 428.

A burst period signal BP (FIG. 4) for a transmission request signal is provided on a line 430 to an OR gate 432 together with the ready signal RY on a line 434. The signals BP or RY provide the transmitter control signal TC on the line 65. The ready signal RY on the line 434 is also applied to an AND gate 436 together with the master timing signal MT to provide a transmitter timing signal TT on a line 438 to the controller 3 for formatting data packets.

A transfer state signal TS (FIG. 4) is provided on a line 440 from the reception control unit 410 to the slot generator 412 and to the transmission control unit 414 to inhibit operation of the slot generator 412 when data is transferred from the receiver 5 and to assist in the operation of the transmission control unit 414.

A soliciting period signal SP (FIG. 4) on a line 442 is generated by the transmission control unit 414 to initiate a contention sequence in the generator 412.

A next slot timing signal NS (FIG. 4) on a line 444 and an active slot control signal AS on a line 446 are generated by the generator 412 for control of transmission requests.

Figure 5A:
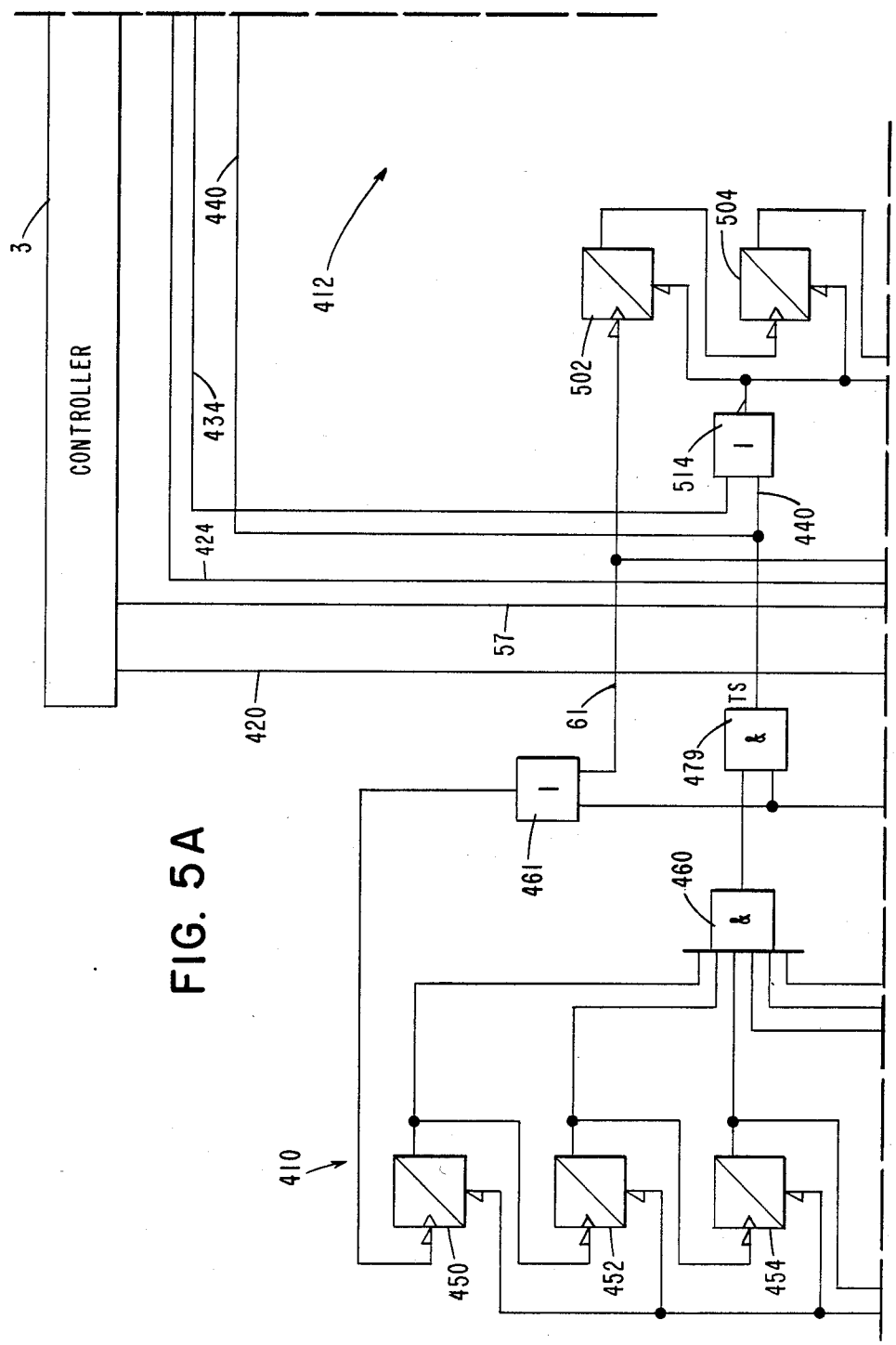
Figure 5B:
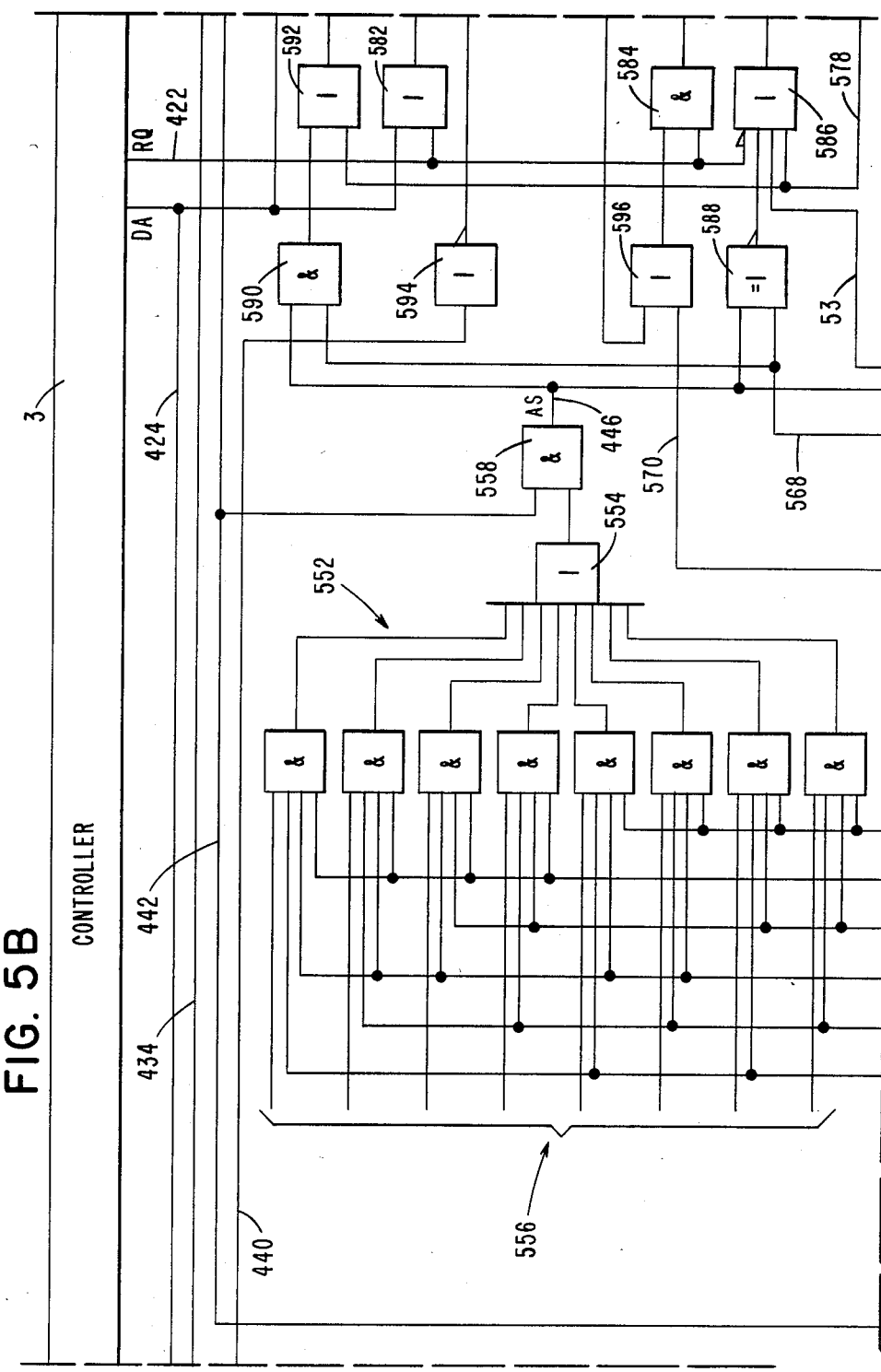
Figure 5D:
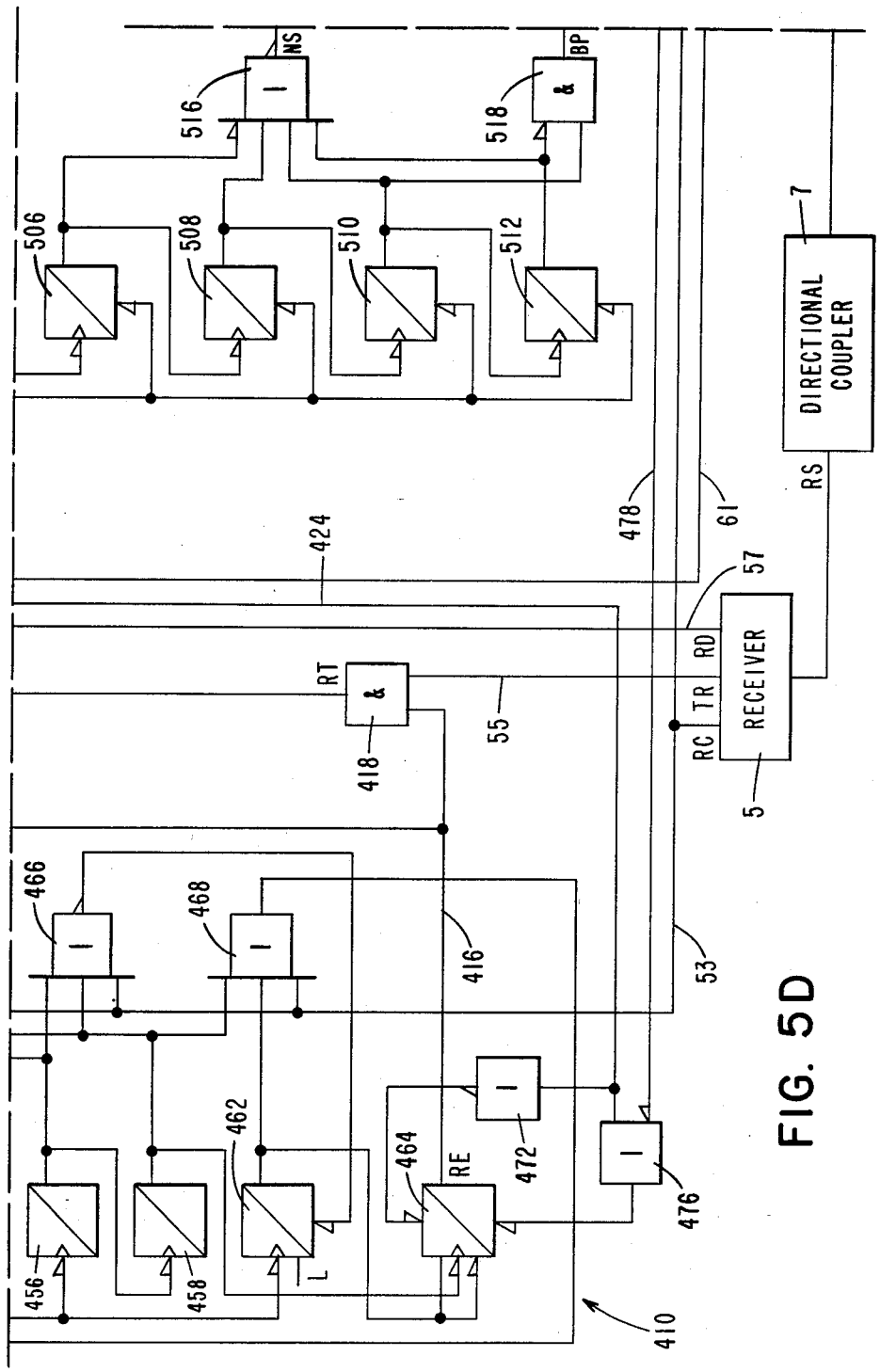
Figure 5E:
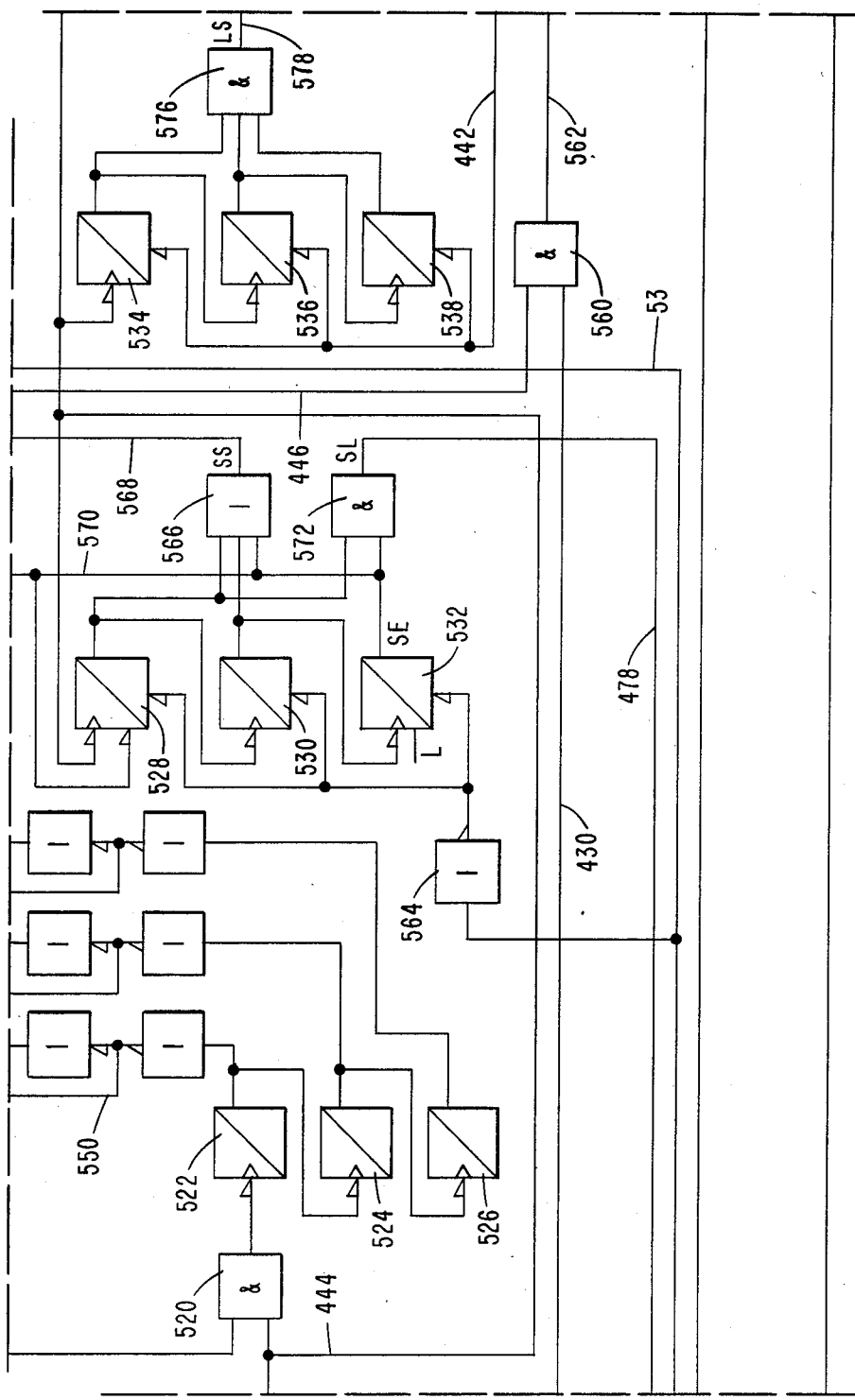
Figures 6A, 6B:
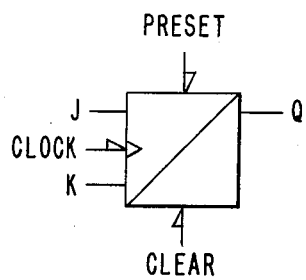
FIGS. 6A and 6B are a schematic representation and truth table respectively of a J-K flip-flop used in the circuit of FIGS. 5A-5F.

The circuit diagram of the contention controller 4 is shown in more detail in FIGS. 5A, 5B, 5C, 5D, 5E, and 5F and a basic unit of the circuit, a J-K flip-flop, is shown in FIG. 6A, with a truth table for the flip-flop being shown in FIG. 6B. The flip-flop is chosen so that the circuit may easily be implemented in large scale integration.

As shown in FIG. 6A, the terminals of the flip-flop are J and K input terminals, a Q output terminal, a clock terminal, and preset and clear terminals. The flip-flop is clocked by a downward edge transition. The Q output of the flip-flop shown in FIG. 6A is set high when a high signal is applied to the J input terminal and is set low when a low signal is applied to the J input terminal. When low signals are applied to both the J and K input terminals the Q output remains the same, and when high signals are applied to both the J and K input terminals the output is toggled. Also, it should be understood that with respect to various flip-flops shown in FIGS. 5A-5E, any terminals shown unconnected are held high, unless they are marked "L" in which case they are held low.

The reception control unit 410 shown in FIGS. 5A and 5D includes a 0-31 counter comprising five flip-flops 450, 452, 454, 456, 458, which counter is enabled via an OR gate 468 whenever the RC signal is present on the line 53, the output of the OR gate being coupled to the clear terminals of the flip-flops 450, 452, 454. A flip-flop 462 is controlled by the counter 450-458 and serves to enable the counter via the OR gate 468. A flip-flop 464 is also controlled by the counter 450-458 to provide the reception expected signal RE on the line 416 when data transmissions are anticipated.

The purpose of the reception control unit 410 is to distinguish a block of multiple overlapping transmission request signals from regular data. This is achieved by measuring the length of the received signals and by virtue of the fact that the received multiple transmission request signals are shorter at each successive slot in the contention procedure, ending in the receipt of a single transmission request signal, after which regular data can be expected and detected. Regular data has a minimum length of 32 bits, while the pulse burst of a single transmission request signal has a length of 16 bits. A signal of less than 8 bits is considered as noise and no action will be taken on such a signal. When a pulse burst of a single or multiple transmission request signal has been detected shorter than 24 bits, the reception expected signal RE is generated after 32 clock pulses. When during the reception expected state pulse bursts of further transmission request signals are received, these signals are never longer than the length in the previous slot. When a signal is received longer than 31 bits it can only be due to regular data and the transfer state signal TS is generated.

The states of the reception control unit 410 (FIGS. 5A and 5D) are determined by the flip-flop 464 and the 0-31 counter 450-458. When the output of the flip-flop 464 is low, filtering of noise and transmission request signals is performed. When the output of the flip-flop 464 is high, the received data timing signal RT is transmitted to the controller 3. When the output of the flip-flop 464 is high and the counter 450-458 reaches position 31 while the signal RC is high, the transfer state signal TS is generated.

The 0-31 counter 450-458 (FIG. 5A & 5D) is clocked by MT pulses on the line 61 via an OR gate 461. The first eight steps of the counter are enabled by the OR gate 468 whenever the RC signal appears on the line 53, the output of the OR gate 468 being coupled to the clear terminals of the flip-flops 450, 452, 454. The flip-flop 462 is clocked by the output of the flip-flop 454, and the J input of the flip-flop 462 is controlled by the inverted output of the flip-flop 458. The flip-flop 464 is clocked by the output of the flip-flop 462 for operation in the toggle mode.

The Q outputs of the flip-flops 450-458 (FIGS. 5A & 5D) together with the signal RC are connected as inputs to an AND gate 460, the output of the AND gate 460 being coupled to the inputs of the OR gate 461 and an AND gate 479. The Q outputs of the flip-flops 458, 456, and the signal RC are connected to the inputs of a NAND gate 466, the output of which serves to clear the flip-flop 462. The Q outputs of the flip-flops 458, 462 and the signal RC are coupled to the inputs of the OR gate 468, the output of which serves to enable the flip-flops 450-454. The direct access signal DA on the line 424 is coupled via an inverter 472 to the preset terminal of the flip-flop 464 and is coupled via an OR gate 476 to the clear terminal of the flip-flop 464. A silence signal SL on a line 478 is coupled to an inverting input of the OR gate 476.

The operation of the reception control unit 410 will now be described with reference to FIGS. 5A, 5D, 7A and 7B. The counting of the unit 410 begins as soon as transmissions are received by the receiver 5 when the signal RC goes high. This forces the output of the OR gate 468 high, to enable an initial counting operation by the flip-flops 450, 452, 454 which are clocked by MT pulses via the gate 461 up to a count of 8. Referring to the flow chart of FIGS. 7A and 7B, which describe the operation of the reception control unit 410, Ⓐ and Ⓑ indicate connectors in the flow chart and a number in parentheses like (802) in the specification indicates a step or location. The continuous operation of the circuit 410 is considered first at (802) which indicates the count C of the counter 450–458. If C<7 and the signal RC is high (804) then the receipt of a MT clock pulse (806) increments the counter (808). If, however, the signal RC goes low (804), then the counter is cleared (810).

The purpose of the initial count is to test receipt of a transmission request signal. If the count is less than 8 and the signal RC goes low, this indicates transients on the line. If, however, the signal RC is high for the count of 0–8 this probably indicates the detection of a transmission request signal (see FIG. 3D).

When C=7 (812), with the signal RC high (814), receipt of the next MT clock pulse (816) resets the flip-flop 454 so that the Q outputs of the flip-flops 456 and 462 are clocked high (818), the J input of flip-flop 462 being controlled by the inverted output of the flip-flop 458. The setting of the flip-flop 462 holds the output of OR gate 468 high and hence enables the counter to run to 31 independently of whether the signal RC is low or high.

Figure 7A:
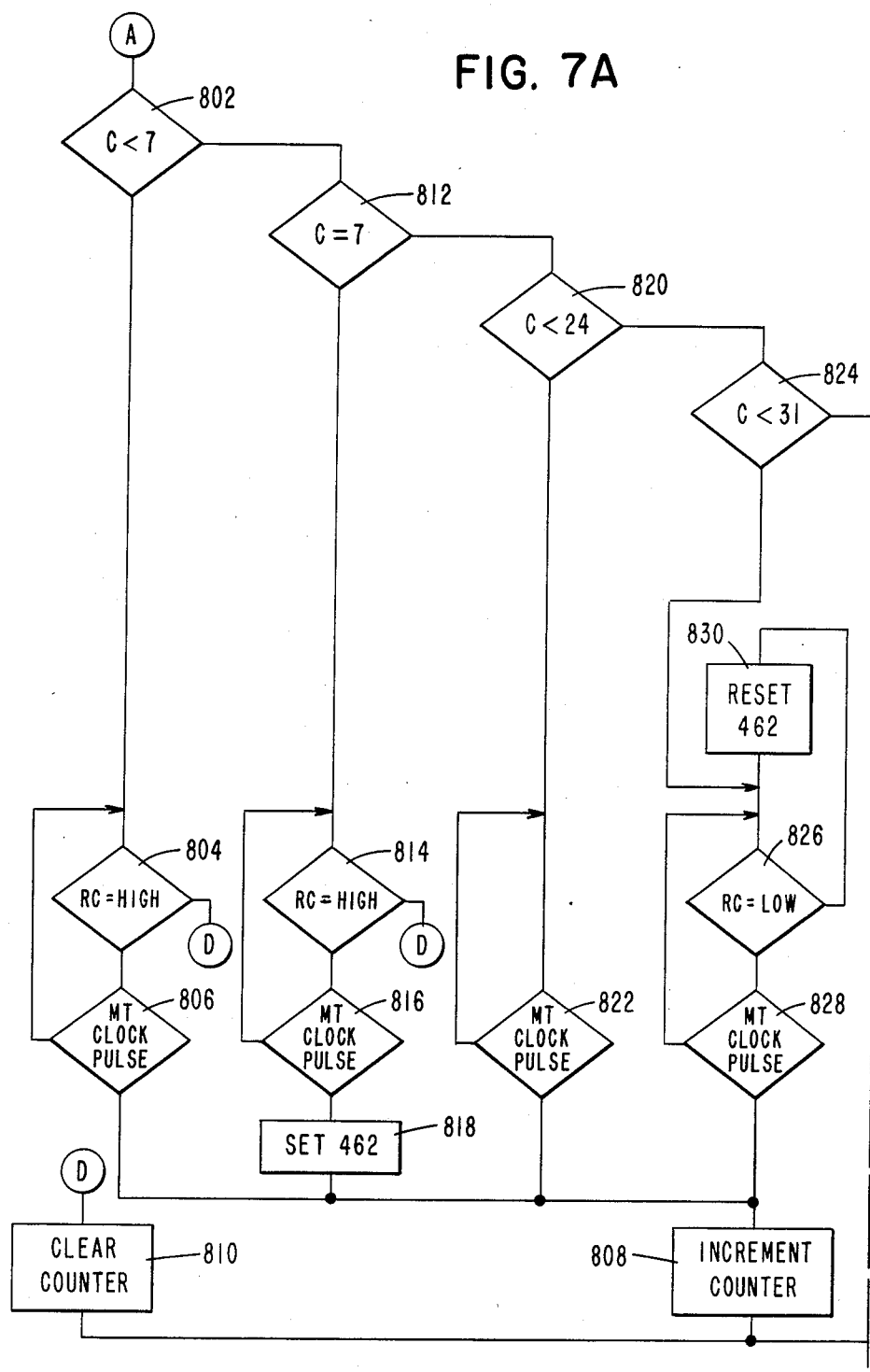
FIGS. 7A and 7B taken together are a flow chart describing the operation of a reception control unit of a contention controller of FIGS. 5A-5F.

The counting continues (822) while C<24 (820) as shown in FIG. 7A. At 31>C>24 (824), if the signal RC is low (826) this indicates that a single transmission request signal, or a short multiple request signal, has been received which is unable to simulate regular data. The counter is incremented (828) up to C<31 (824). If, however, the signal RC is high, this may indicate multiple transmission request signals and the NAND gate 466 is enabled to reset the flip-flop 462 (830). With the signal RC low at 31>C>24, indicating a single or a short multiple transmission request signal, then at C=31, since the flip-flop 464 is not set (832) but the flip-flop 462 is set (834), upon the receipt of the next MT clock pulse (838) with the signal RC low (836), the flip-flop 464 is clocked by the flip-flop 458 with J, K inputs high to toggle the flip-flop 464 (840), thereby providing the reception expected signal RE on the line 416 to enable the AND gate 418 (FIGS. 4 and 5A) to transmit a received data timing signal RT to the controller 3. At the same time, the counter 450–458 is reset (842). If at C=31 the signal RC is high (836) indicating multiple transmission signals, then the flip-flop 462 is reset (844), and the signal RE is not generated. When the signal RC goes low (846), the next MT clock pulse (848) resets the counter 450–458 (842).

Figure 4:
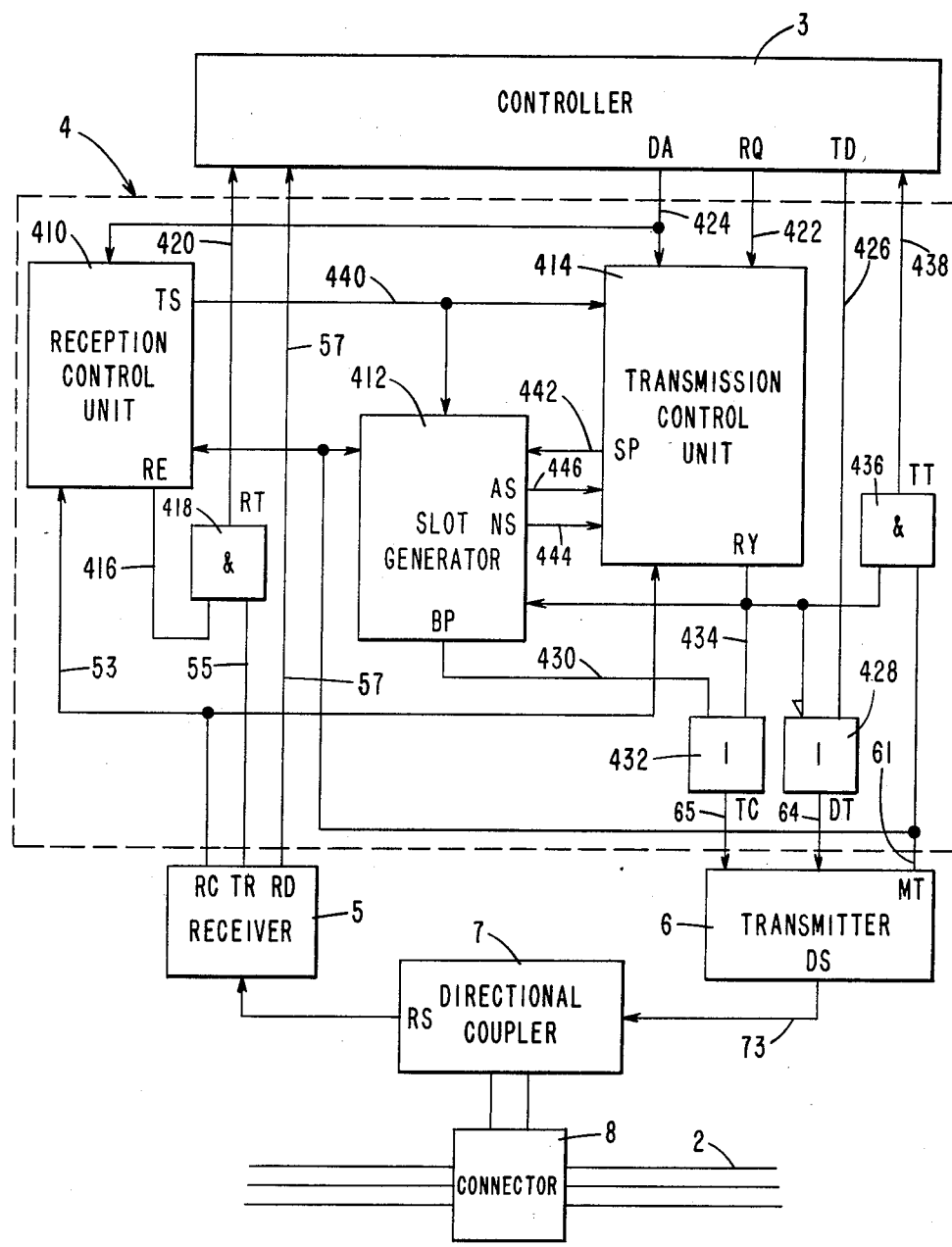
FIG. 4 is a more detailed block diagram of the station of FIG. 1.
Figure 7B:
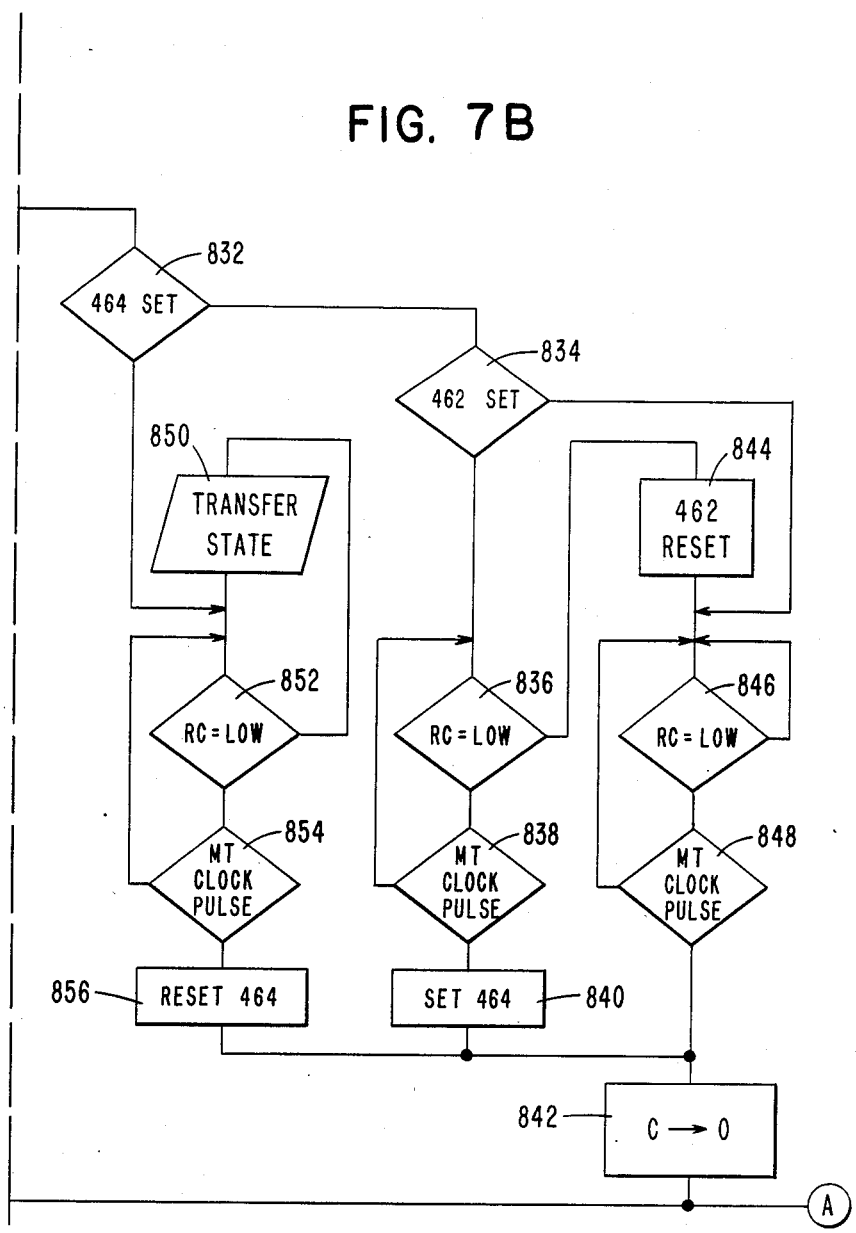

Assuming the signal RE has been generated, when the signal RC again goes high this probably indicates the reception of a data frame. The count cycle is repeated (FIG. 7A) while C<31 (824). If the signal RC remains high, then receipt of a data frame is indicated, and at C=31 the output of the gate 460 goes high. This inhibits via the gate 461 further counting operations. Since the output of the flip-flop 464 is high, the output of the AND gate 479 goes high to provide a transfer state signal TS (850) on the line 440 (FIGS. 4 and 5A). The signal TS inhibits operation of the transmitter until the signal RC goes low (852), when the entire data frame is received. When the signal RC goes low (852) as shown in FIG. 7B, then at the next MT clock pulse (854) the flip-flop 464 is reset (856) to terminate the signal RE, and the counter 450–458 is reset (842).

The received data frame is received in the controller 3 and is subject to the various procedures of the protocol such as address recognition, cyclic redundancy check, etc.

In some circumstances the operation of the reception control unit 410 can be overriden. If the signal DA (FIG. 5C) goes high on the line 424 then the flip-flop 464 (FIG. 5D) is immediately set via the OR gate 476 to provide the reception expected signal RE. The silence signal SL on the line 478 is employed to reset the flip-flop 464 should the flip-flop previously have been set by the signal DA or should the flip-flop 464 have been set by a contention action, but no data transfer occurred. The signal DA may be employed where full duplex operation is required. Thus a station can transmit a data frame to another station while the other data station transmits a data frame to the first station. The provision of the bridge directional coupler 7 permits full duplex operation.

The remainder of the contention controller 4 (FIG. 4) will now be described, comprising the slot generator 412 and the transmission control unit 414, the purposes of which are to carry out channel contention cycles and to enable data transmission, respectively.

Referring to FIGS. 5A–5F in addition to FIG. 4, the slot generator 412 comprises a 0–63 slot timer or counter comprising six flip-flops 502–512 which are incremented by the master timer MT pulses provided on the line 61 from the transmitter 6. A NOR gate 514 coupled to the clear terminals of the flip-flops 502–512 clears the counter when the transfer state signal TS on the line 440 is high or the ready signal RY on the line 434 is high. The Q output of the flip-flop 506 is coupled to an inverting input of a NOR gate 516 (FIG . 5D), and the Q outputs of the flip-flops 508, 510, 512 are coupled to non-inverting inputs of the gate 516 to provide a next slot signal NS on the line 444. The Q output of the flip-flop 510 is coupled to an input of an AND gate 518 and the Q output of the flip-flop 512 is coupled to an inverting input of the AND gate 518 to provide the burst period signal BP on the line 430.

The output of the NOR gate 516 (FIG. 5D) provides a next slot signal NS on the line 444 to an input of an AND gate 520 (FIG. 5E) for the purpose of clocking a slot sequence counter comprising flip-flops 522–526. The other input to the AND gate 520 is controlled by the soliciting period signal SP on the line 442. The next slot signal NS is also employed to clock a silence control counter comprising flip-flops 528–532, a soliciting period counter comprising flip-flops 534–538, and a chain of flip-flops 540, 542, 544 (FIG. 5C) which provide transmission control signals.

The slot sequence counter 522–526 (FIG. 5E) serves to allot sequentially eight defined slots (such as are shown in Table 1) to a station like 1. The counter 522–526 controls a multiplexer comprising six inverters 550 (FIG. 5E), eight AND gates 552 (FIG. 5B), an OR gate 554 and a final AND gate 558. The multiplexer serves as a translator between a set of input signals and one output signal. The AND gates 552 are each controlled by 3 binary coded signals representing a number from 0 to 7, this number being different for each gate, and by a respective input line 556 (FIG. 5B) which is connected to either a low or a high voltage representing one element of the cyclic contention code. The eight input lines 556 are connected to low or high voltages as represented in Table 1 by "0"s and "1"s for a specific station number. There is always one number presented by the slot sequence counter to the set of eight AND gates 552 so that one of the AND gates 552 is enabled to transmit to the OR gate 554 the signal defined by its respective input line 556. Each gate 552 represents a different number, the uppermost gate 552 as shown in FIG. 5B representing 0 and the lowermost gate 552 representing 7. Since the slot information is needed only during the soliciting period, the signal SP (FIG. 4) from the transmission control unit 414 enables the final AND gate 558 of the multiplexer to output the signal applied to it from the OR gate 554. An active slot is represented by an input line 556 connected to a high voltage and the output for an active slot is also a high voltage. The output of the gate 558 represents the active slot signal AS on the line 446 during the soliciting period. This signal is applied to an AND gate 560 together with the burst period signal BP on the line 430 to provide a transmission request signal on a line 562 to the OR gate 432.

The transmission control unit 414 operates with the aid of two counters, the silence control counter comprising the flip-flops 528–532 (FIG. 5E) and the soliciting period counter comprising the flip-flops 534, 536 and 538. The function of the silence control counter 528–532 is to indicate at the end of each slot that silence on the data channel 2 was not interrupted during this slot and to indicate that during the last four slots silence on the data channel 2 was not interrupted. The silence control counter 528–532 is continuously active except during data transfer.

The operation of the silence control counter 528–532 (FIG. 5E) is under the control of the trailing edge clock pulse NS on the line 444 (see also FIG. 4) which is connected to the output of the gate 516 (FIG. 5D). The counter 528–532 (FIG. 5E) is adapted to be cleared whenever the received carrier RC signal from the receiver 5 appears on the line 53 connected via an inverter gate 564 to the clear terminal of each of the flip-flops 528, 530, 532. The counter 528–532 can increment from 0 to 5 and is then blocked for further incrementing. In all positions the counter 528–532 can be cleared by the received carrier RC signal. The K input of the flip-flop 528 is controlled by the inverted Q output of the flip-flop 532 in order to block the counter 528–532 at its position 5. Position 0 of the counter 528–532 indicates that in the current slot period, silence is not maintained. Positions above 0 of the counter 528–532 indicate that in the current slot period, silence is not yet interrupted. Positions above 3 indicate that in the previous three slots and in the current slot, silence is not yet interrupted. Position 5 finally indicates that at least in the four previous slots and in the current slot, silence is not yet interrupted. The positions above 0, above 3 and position 5 are provided as outputs. Positions above 0 are indicated by an OR gate 566 (FIG. 5E) whose inputs are respectively the Q outputs of the flip-flops 528–532. The output of the OR gate 566 is available as a silent slot signal SS on a line 568. The positions above 3 are provided directly from the Q output of the flip-flop 532 as a silence expected signal SE on a line 570. Its purpose is to enable the detection of 4 silent slots. Position 5 of the counter 528–532 is detected by an AND gate 572 controlled by the Q outputs of the flip-flops 528 and 532, the AND gate 572 providing the silence signal SL on the line 478.

The soliciting period counter 534–538 (FIG. 5E) determines the maximum soliciting period within which a station must have gained the use of the data channel 2. Normally, a station will have gained use of the data channel 2 when all eight slots have been used sequentially. A station can detect that it is to abort channel contention by listening during a passive slot, and it can detect that use of the data channel 2 has been gained by listening during an active slot. However, when a station is situated very remotely from other stations its receiver must be adapted to receive very weak signals. Under these circumstances it may happen that the station detects its own transmission request signals leaking through the directional coupler 7. In this situation the soliciting period counter 534–538 indicates after eight slots that the station has gained the use of the data channel 2.

The operation of the soliciting period counter 534–538 (FIG. 5E) is controlled by the trailing edge clock pulse NS on the line 444, and the counter 534–538 is adapted to be cleared whenever a soliciting period signal SP on the line 442 (see also FIG. 4) disappears, the line 442 being connected to the clear terminals of the flip-flops 534, 536, 538. The soliciting period counter 534–538 is enabled whenever the SP signal is high. The counter 534–538 is a 0–7 counter which indicates in position 7 that 7 slots are already used and that an eighth slot is in progress. Position 7 is detected by an AND gate 576 connected to the outputs of the flip-flops 534–538, the gate 576 providing a last slot signal LS on a line 578 connected to the output of the AND gate 576.

The transmission control unit 414 (FIGS. 4, 5B, and 5C) contains an arrangement of gates coupled to the flip-flops 540–544 (FIG. 5C) and responsive to control signals from the remainder of the contention controller 4 and controller 3 for ensuring that the flip-flops 540–544 produce transmission control signals.

The direct access signal DA (FIG. 5B) on the line 424 is applied via an inverter 580 to the preset terminal of the flip-flop 540 (FIG. 5C) and via an input of an OR gate 582 (FIG. 5B) to the clear terminal of the flip-flop 540. The request signal RQ on the line 422 is applied to an input of the OR gate 582, to an input of an AND gate 584 (FIG. 5B) which is connected to the J input of the flip-flop 544, and to an inverting input of an OR gate 586 (FIG. 5B) which controls the K input of the flip-flop 544.

The silent slot signal SS (FIG. 5E) on the line 568 is applied to an input of a contention arbitration EXCLUSIVE NOR gate 588 (FIG. 5B) and to an input of an AND gate 590. The active slot signal AS on the line 446 is also applied to an input of the AND gate 590 and the XNOR gate 588. The output of the XNOR gate 588 is connected via the OR gate 586 to the K input of the flip-flop 544 (FIG. 5C), and the output of the AND gate 590 is connected via an OR gate 592 to the J input of the flip-flop 540. The last slot signal LS (FIG. 5E) on the line 578 is applied to an input of the OR gates 586 and 592 (FIG. 5B). The RC signal on the line 53 (FIG. 5D) is applied to the OR gate 586 (FIG. 5B). The TS signal on the line 440 (FIG. 5A) is applied via an inverter gate 594 (FIG. 5B) to the preset terminal of the flip-flop 542 (FIG. 5C), and the Q output of the flip-flop 542 is applied to its K input and to an input of an OR gate 596 (FIG. 5B). The silence expected signal SE (FIG. 5E) on the line 570 is also applied to the OR gate 596 (FIG. 5B), and the output of the OR gate 596 is applied to an input of the AND gate 584.

The operation of the transmission control unit 414 and slot generator 412 will now be described.

There are two conditions in which transmission may be required by the station, i.e. the request signal RQ (FIG. 5B) going high:

(a) while the data channel is already occupied with data transmission, or (b) where the data channel is unoccupied.

For condition (a) while the data channel is occupied with a data transmission, the signal TS (FIG. 5A) will be high, disabling the slot timer 502-512 (FIG. 5A) and setting the flip-flop 542 (FIG. 5C) high. Since the request signal RQ is high, the output of the AND gate 584 (FIG. 5B) will go high, providing a high input to the J input of the flip-flop 544 (FIG. 5C). In this state, no transmission by the station is possible. When transmission on the channel ceases, the signal RC on the line 53 goes low, forcing the signal TS low so that the slot timer 502-512 (FIG. 5A) is enabled to initiate a contention operation for use of the channel. Referring to the flow chart of FIG. 8 which describes the operation of the slot timer, (B) indicates a connector in the flowchart, and a number in a parenthesis in the specification indicates an operation, step, or situation. The slot timer 502-512 is cleared (906) when the ready signal RY on the line 434 is high (902) or the transfer state signal TS on the line 440 is high (904). When the slot timer 502-512 reaches position 63 (908) it will at the next MT clock pulse (926) progress to its zero position (928). When the slot timer 502-512 is in a position less than 63 (908) a next MT clock pulse (910) will increment the slot timer (912). The NOR gate 516 (FIG. 5D), which is controlled by the flip-flops 506, 508, 510, 512 causes next slot signal NS to go high (916) at the slot timer position 4 (914), but provides a trailing edge next slot pulse NS at the slot timer position 8 (918). It should be understood that, after synchronization, the slot timer 502-512 counts 8 clock pulses before the next slot pulse NS is produced so as to ensure that the data channel is silent for a period of 8 pulses before production of the NS pulse. The AND gate 518 (FIG. 5D), which is controlled by the flip-flops 510 and 512 is enabled to produce burst period signal BP (924) during the slot timer positions 16-31 (922).

When the next slot signal NS (FIG. 5D) goes low at slot timer position 8, the downward transition clocks the silence control counter 528-532. The flip-flops 540, 542 and 544 (FIG. 5C) are also clocked. Since the J input to the flip-flop 544 is high at this time, the soliciting period signal SP (FIG. 5C) on the line 442 goes high. The output of the flip-flop 542 goes low. The signal SP enables the gates 558 and 520 and the soliciting period counter 534-538.

Enabling of the gate 520 (FIG. 5E) permits the slot sequence counter 522-526 to increment. Depending on the contention code assigned to the data station as presented to the multiplexer input 556 (FIG. 5B), the output of the gate 558 will either go high providing signal AS (on line 446) representing an active contention slot in which a transmission request signal is transmitted, or will go low if a silent slot occurs, i.e. a slot in which no transmission request signal is transmitted. If the signal AS is high, the gate 560 (FIG. 5E) is enabled so that upon the slot timer 502-512 reaching position 16 the burst period signal BP (FIG. 5D) goes high and appears on the line 562, whereby the transmitter control signal TC appears on the line 65. The signal BP remains high until the slot timer 502-512 reaches position 32. During this period of sixteen timing pulses a pulse burst (FIG. 3D) of a transmission request signal appears on the data channel 2. For the remainder of the slot interval the signal BP is low. There is thus provided a transmission request signal of the form shown in FIG. 3D in a time period or slot. The station will generate a sequence of slots, in each of which a transmission request signal will either be transmitted or not transmitted, according to the cyclic code.

Normally, the receiver 5 (FIG. 4) cannot detect a transmission request signal emitted by the transmitter 6, by virtue of the directional coupler 7. If during the contention slot of 64 timing pulses other transmission request signals are detected, then the signal RC goes high on the line 53 thereby resetting the silence control counter 528-532 whereby the silent slot signal SS (FIG. 5E) on the line 568 goes low. The outputs of the XNOR gate 588 (FIG. 5B) and the AND gate 590 therefore go low. The RC signal is transmitted to the OR gate 586. Under these conditions, upon the appearance of the next clocking signal NS→LOW at ST=8 (920) as shown in FIG. 8, the signal SP is terminated at the flip-flop 544 (FIG. 5C) in favor of the other competing data stations because a synchronization error of the contention slot has been detected which for this station cannot result in a correct contention resolution.

Figure 8:
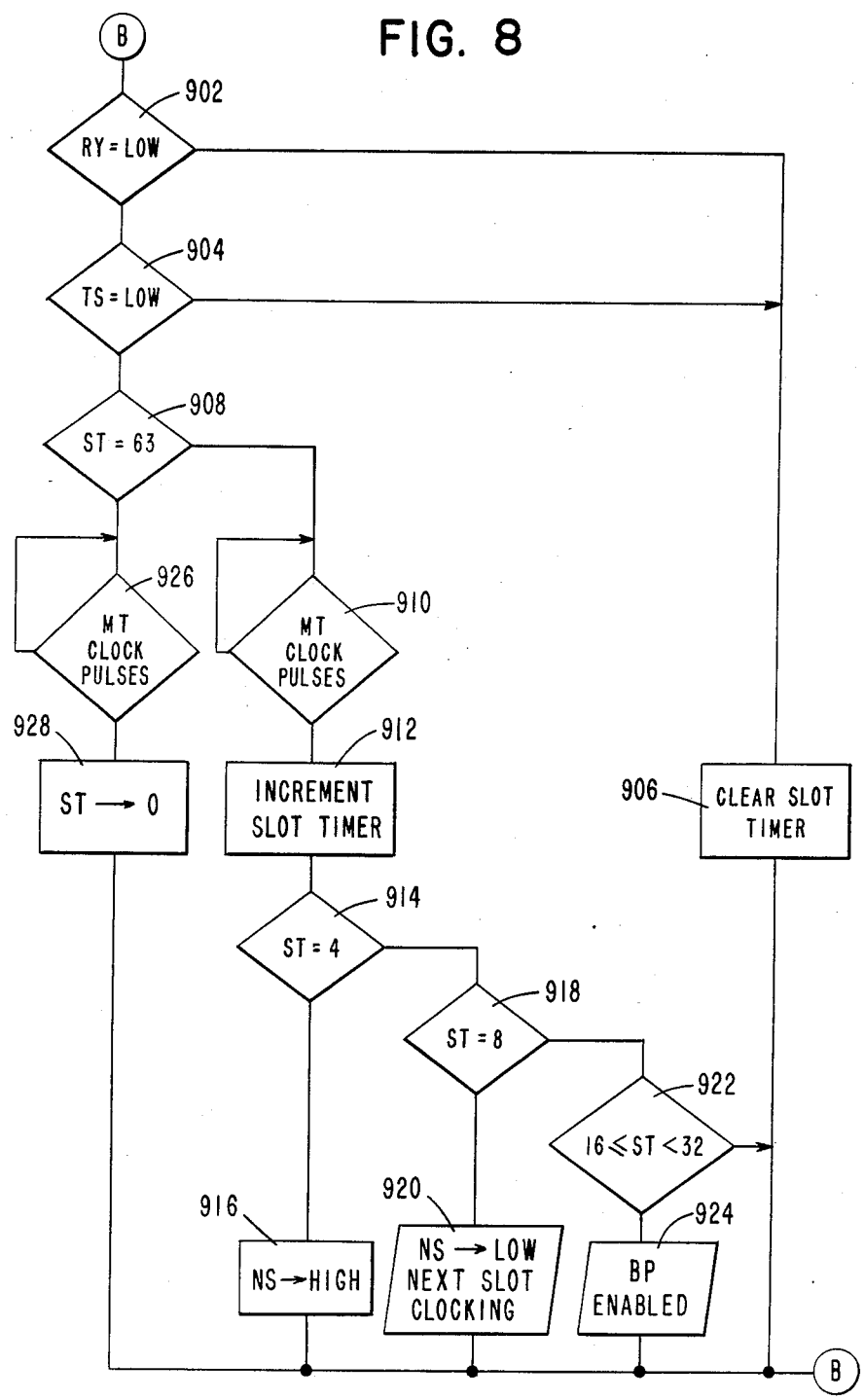
FIG. 8 is a flow chart describing the operation of a slot generator of the contention controller of FIGS. 5A-5F.

If however no other transmission request signals are detected, during a slot in which a transmission request signal is made, the signal RC remains low and on the next low clocking pulse NS at ST=8 (920), as shown in FIG. 8, both inputs to the XNOR gate 588 (FIG. 5B) and the AND gate 590 will be high so that the flip-flop 540 will be set to provide the RY signal (FIG. 5C) on the line 436, indicating use of the data channel is permitted. The signal RY disables via the gate 514 (FIG. 5A) further operation of the slot timer 502-512 and provides the signal TC (FIG. 5F) on the line 65 so that a data frame can be transmitted via the line 64 as the signal DT. The flip-flop 544 (FIG. 5C) is reset so that the signal SP goes low to abort the contention sequence.

In the case of the signal AS (FIG. 5B) on the line 446 going low indicating a silent slot, then if during the time slot other transmission signal requests are detected from another station causing the signal RC (FIG. 5D) to go high, the silence control counter 528-532 (FIG. 5E) is reset and the silent slot signal SS on the line 568 goes low. The presence of two low inputs to the XNOR gate 588 (FIG. 5B) causes the output to go high, thereby resetting the flip-flop 544 (FIG. 5C) and causing the signal SP to go low at the next clock pulse so as to terminate the contention operation in favor of the other competing data stations.

At the termination of a contention sequence, the slot timer 502-512 (FIGS. 5A & 5D) is reset by the signal RY (FIG. 5C) (902) (FIG. 8) or the signal TS (FIG. 5A) (904) (FIG. 8) and the soliciting counter 534-538 (FIG. 5E) is reset when the signal SP (FIG. 5C) goes low. However, the slot sequence counter 522-526 (FIG. 5E) is not reset, and at the next contention sequence the sequence will begin at the next position of the slot sequence counter 522-526, i.e. the next position in the cyclic code.

The flip-flop 540 (FIG. 5C) may also be set to provide the signal RY in the case of the signal DA on the line 424 going high, thereby overriding the contention sequence.

As mentioned above, data transmission may also be required for condition (b) where the data channel is unoccupied.

Since in periods of silence no received carrier signal RC (FIG. 5D) appears on the line 53, the slot timer 502-512 and the silence control counter 528-532 will be incremented by the next slot pulses NS appearing on the line 444 regardless of whether a contention operation occurs. Thus, the silence expected signal SE (FIG. 5E) on the line 570 will be set after four consecutive periods of silence and thereafter will remain set. Since as shown in Table 1 no station has more than three consecutive periods of silence in the cyclic contention codes, setting of the signal SE shows that no other data station is contending for channel control. Thus if the request for transmission signal RQ (FIG. 5C) is set, the AND gate 584 (FIG. 5B) is enabled to set the flip-flop 544 (FIG. 5C) to provide the soliciting period signal SP and initiate a channel contention sequence.

On the fifth silent slot, the gate 572 (FIG. 5E) is enabled to provide the silence signal SL on the line 478. The signal SL is used to reset the flip-flop 464 (FIG. 5D) to terminate the reception expected signal RE. This may be necessary where the signal RE is set in anticipation of data transfer but no transfer occurs.

In a local area network where the data station 1 (FIG. 4) is situated at a position remote from the other data stations, then the sensitivity of the receiver must be set in order to detect signals where the signal loss may be as high as 40 dB. Since the sensitivity of the directional coupler 7 is 28 dB., the receiver having a higher sensitivity will detect transmissions from the transmitter 6 leaking through the directional coupler. Thus, in a contention sequence where the station 1 wishes to transmit, the signal RC will go high when the transmitter 6 makes a transmission request signal, thereby resetting the silence control counter 528-532, so that the signal SS (FIG. 5E) goes low. Thus the condition of the signal SS high and the signal AS high at the gate 588 (FIG. 5B), indicating that use of the data channel is permitted, will not occur. To cater for this situation, the soliciting period counter 534-538 in a contention sequence will provide the signal LS (FIG. 5E) on the line 578 after seven time slots in which the signal SP is active. In other words the signal LS will be provided after seven slots in which contention is not resolved in favor of other data stations. The signal LS is operative to reset the flip-flop 544 (FIG. 5C), thereby terminating the SP signal, and to set flip-flop 540, thereby providing the RY signal on the line 434 to enable data transmission. The signal LS may be provided at an earlier slot when it is certain that contention can always be resolved earlier. A same number of active slots used in all stations provides such a condition. In this case the output of flip-flop 534 need not be connected as an input to gate 576.

We claim:

1. A data communication network comprising:
a plurality of data stations;
a common data channel connecting said data stations;
each one of said data stations having a transmitter and a receiver, wherein each said data station includes channel contention means coupled to the associated said transmitter and receiver for initiating transmission request signals in a sequence of consecutive time periods in each of which a said data station either transmits or does not transmit a transmission request signal according to a predetermined code assigned to that said data station;
said channel contention means further including contention resolving means for determining during said sequence whether another one of said data stations is transmitting a said transmission request signal while a first one of said data stations is not transmitting such a said transmission request signal; and
said contention resolving means including means for aborting a contention for said common data channel by said first one of said data stations when said contention resolving means determines that any other one of said data stations is transmitting;
said channel contention means for each said data station including means for generating transmission request signals according to said predetermined code which is cyclic and unique to the associated said data station, and also including means for commencing a succeeding channel contention at a point in the associated cycle of said predetermined code determined by the point in said cycle at which a previous contention for said common data channel ceased.

2. The network as claimed in claim 1, wherein at least one of said data stations, hereinafter referred to as a second data station, has a directional coupler connecting the associated said transmitter and receiver of said second data station to said common data channel to enable the associated said receiver to monitor said common data channel for transmission request signals transmitted by other said data stations at the same time as said transmitter of said second data station makes transmissions; and wherein said contention resolving means of said second data station includes means for determining in a said time period whether said second data station is the only one of said data stations to transmit a transmission request signal, in which case use of said common data channel by said second data station is permitted.

3. The network as claimed in claim 1, wherein said contention resolving means of at least one said data stations, hereinafter referred to as a second data station, includes means for determining over a predetermined time of channel contention whether a said transmission request signal from another said data station occurs in a said time period in which said second data station does not transmit a transmission request signal, said network being such that if such transmission by another said data station does occur, channel contention by said second data station is aborted, but that, if not, use of said data channel by said second data station is permitted.

4. The network as claimed in claim 1, wherein said channel contention means for each said data station includes means for detecting a period of silence in which no data transmissions take place on said data channel greater than a maximum period of silence occurring in any transmission request assigned to said data stations according to said predetermined code and for providing a silence signal in response thereto, said channel contention means being responsive to said silence signal to initiate a channel contention sequence.

5. The network as claimed in claim 1, wherein each said data station includes means for overriding said channel contention means of the associated said data station in response to a direct access signal from the associated said data station for directly enabling data transmission and data reception by the associated said data station.

6. The network as claimed in claim 1, in which each said transmission request signal comprises a pulse burst of predetermined duration, and in which the minimum bit length of a data transmission is greater than the length of said pulse burst, each said data station having means to prevent receipt of a simulated data transmission formed by overlapping transmission request signals received from more than one of said data stations, and also to enable receipt of a data transmission when a received pulse burst has a length less than a predetermined value which is not greater than the minimum bit length of a data transmission.

7. A method of communicating in a data communication network on a common data channel between data stations, wherein one of said data stations wishing to transmit data, hereinafter referred to as a said first data station, performs the steps of:

monitoring said common data channel, hereinafter called channel, to ascertain whether data transmissions from other said data stations are currently taking place on said channel;

contending for use of the said channel by ascertaining that data transmissions on said channel have ceased;

initiating transmission of transmission request signal during a sequence of consecutive time periods in each of which said first data station either transmits of does not transmit a transmission request signal on said channel according to a predetermined code assigned to said first data station;

monitoring said channel during said sequence; and aborting contention for use of the channel if said first data station finds that another said data station is transmitting a transmission request signal while said first data station is not transmitting such a signal wherein said predetermined code is a cyclic code, and wherein, when a channel contention of said first data station ceases, said step of initiating transmission of transmission request signals is effected by said first data station by beginning the next succeeding channel contention at a position in the code determined by the position at which channel contention previously ceased.

8. The method as claimed in claim 7, wherein a said transmission request signal is effected by maintaining a pulse burst of a predetermined duration and thereafter maintaining a period of silence equal to or greater than twice the longest propagation delay associated with said channel.

9. The method as claimed in claim 8, wherein each said data station initiates contention for use of said channel by following the cessation of data transmissions on said channel or by following a period of silence on said channel of a duration greater than the maximum period a silence occurring in any of the transmission request codes assigned to said data stations.

10. The method as claimed in claim 9 wherein at least one said data station, hereinafter called second data station, is able to detect transmission request signals from other said data stations at the same time as said second data station is transmitting a transmission request signal, and wherein said second data station contends for use of said channel by monitoring said channel in each said time period to determine whether said second data station itself is the only said data station transmitting, whereupon said second data station is permitted use of the channel, or whether another said data station is transmitting but said second data station itself is not transmitting, whereupon contention is aborted.

11. The method as claimed in claim 10 wherein at least one said data station, hereinafter called third data station, is unable to discriminate transmission request signals from other said data stations from transmission request signals transmitted by said third data station, and wherein said third data station contends for use of said channel by transmitting transmission request signals for a predetermined time; determining whether transmission request signals from other said data stations occur during any of the said time periods occurring in said predetermined time in which said third data station does not itself transmit a transmission request signal; and aborting contention when such transmission request signals from other said data stations occur, but otherwise using said data channel.

* * * * *